No. 862,719. PATENTED AUG. 6, 1907.
H. E. DAVIS, DEC'D.
M. L. DAVIS, EXECUTRIX.
GAS ECONOMIZER.
APPLICATION FILED APR. 5, 1906.

Witnesses
C. C. Holly.
J. Townsend.

Inventor,
Herbert E. Davis.
by James R. Townsend
his atty

UNITED STATES PATENT OFFICE.

HERBERT E. DAVIS, OF WHITTIER, CALIFORNIA; MARY LOUISA DAVIS, EXECUTRIX OF SAID HERBERT E. DAVIS, DECEASED, ASSIGNOR TO HERSELF.

GAS-ECONOMIZER.

No. 862,719.        Specification of Letters Patent.        Patented Aug. 6, 1907.

Application filed April 5, 1906. Serial No. 310,001.

*To all whom it may concern:*

Be it known that I, HERBERT E. DAVIS, a citizen of the United States, residing at Whittier, in the county of Los Angeles and State of California, have invented a new and useful Gas-Economizer, of which the following is a specification.

The object of this invention is to provide simpler and less expensive means whereby the fuel of gas or gasolene stoves may be greatly economized.

The invention includes improved means for forming a heat-concentrating recess around the bottom of a cooking utensil.

The accompanying drawings illustrate the invention:—

Figure 1:
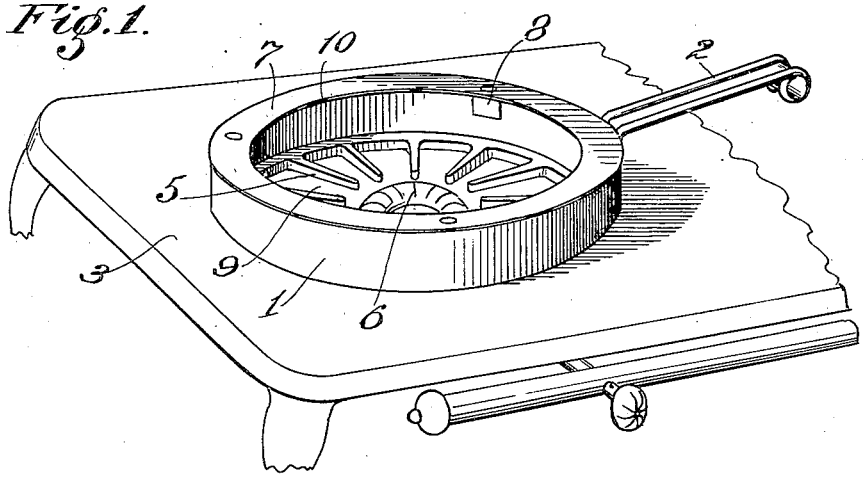
Figure 2:
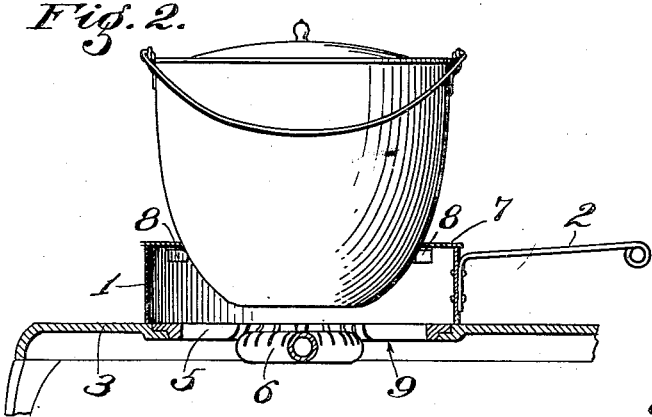
Figure 3:
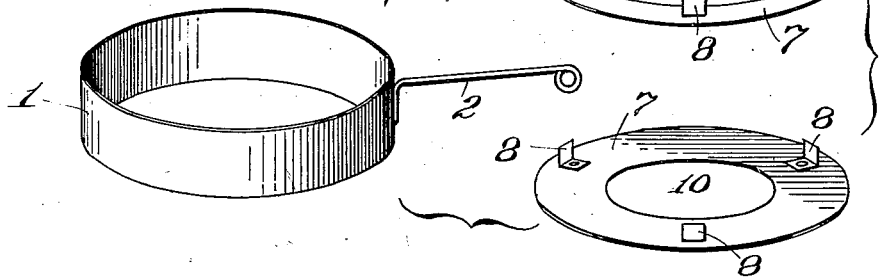

Figure 1 is a perspective view of my newly-invented gas economizer ready for use, a fragment of a gas or gasolene stove being shown. Fig. 2 is a section of the same in use, a kettle being shown in place ready for boiling. Fig. 3 shows a utensil with a plurality of collars for use with different sized pots, kettles, and other vessels.

The utensil by which I carry out the invention consists in a shallow or short drum 1 provided with a handle 2 and adapted to sit on the solid or smooth portion 3 of the top of a gas or gasolene stove around the spider or grate 5 with which the stove is provided for supporting the cooking utensils above the gas burner 6. The drum 1 is preferably of appropriate size to sit on the stove just outside of and encircling said grate or spider and the gas burner.

7 is a collar provided with lugs 8 on its under side and constructed to sit on the top of the drum 1 to receive and hold the pot, kettle, or other cooking utensil above the gas burner. A plurality of collars 7 will preferably go with each drum 1 so that the same drum may be employed with various sized cooking utensils.

In practical use, the drum 1 will be placed on the stove-top 3 encircling the gas-burner opening 9, and the pot, kettle, or other utensil in which the cooking or heating is to be done will be placed inside the collar 7. The collar is designed to fit the cooking utensil close enough to prevent the rapid escape of heat from beneath and around the vessel.

Each gas or gasolene stove may be provided with one or more drums 1 and with an appropriate number of collars 7, so that all or any desired number of gas or gasolene burners of the stove may be utilized. The collars 7 are removable, each being provided with centering lugs of a diameter large enough to sit on the top of the drum 1, and having an orifice 10 of appropriate size for the vessel for which it is intended. The same drum may thus be used for cooking utensils of different sizes.

The drum may be used with or without the collars. In case of large vessels, the drum alone may be used. The collars will be used to cause a practically tight fit between the top of the drum and the cooking vessels that are of smaller diameter than the drum.

The combination of a drum with a gas or gasolene stove, as shown in the drawings, causes the heat to be properly directed onto the vessel to be heated, and thus economizes the gas or gasolene.

It will be seen that the flat collar 7, when in place on the open-ended drum 1, forms in combination therewith an annular heat-concentrating recess around a cooking utensil placed in the opening of the collar. The upper wall of said recess is formed solely by said collar which is held in place by lugs 8 extending laterally therefrom and placed close to its outer edge. In constructing a gas-economizing utensil according to the principles of this invention it is unnecessary to provide any flange on the top of drum 1, for the reason that the centering lugs 8 are placed near the outer edge of collar 7, where they are adapted to engage directly against the upright wall of the drum.

What I claim is:—

1. The combination with a gas or gasolene stove, of an open-ended drum, a flat collar, and a series of centering lugs projecting laterally from said collar to center the same on one side of said drum, said lugs being disposed around said plate adjacent the outer edge thereof to engage the upright wall of the drum.

2. The combination, with a gas or gasolene stove and a burner thereof, or a detachable drum on said stove around the outlet of said burner, and a flat collar having centering lugs to engage said drum, said collar being adapted to contract the upper end opening of the drum and form in combination with the drum an annular heat-concentrating recess around a cooking utensil, the upper wall of said recess being formed solely by said collar.

3. A gas economizer comprising a detached, portable drum adapted to sit on the top of a stove and encircle the burner opening, and provided with a collar adapted to be detachably mounted on the top thereof.

4. A gas economizer comprising a detached, portable drum adapted to sit on the top of a stove and encircle the burner opening, and provided with removable collars having centering lugs.

In testimony whereof, I have hereunto set my hand at Los Angeles, California this 30th day of March 1906.

HERBERT E. DAVIS.

In presence of—
  D. E. GOOCH,
  J. ALLEN TURNER.